United States Patent [19]

Kubo

[11] Patent Number: 5,173,522

[45] Date of Patent: Dec. 22, 1992

[54] RUBBER COMPOSITIONS

[75] Inventor: Junichi Kubo, Yokohama, Japan

[73] Assignee: Nippon Oil Co, Ltd., Tokyo, Japan

[21] Appl. No.: 612,302

[22] Filed: Nov. 13, 1990

[30] Foreign Application Priority Data

Nov. 16, 1989 [JP] Japan .................................. 1-297954

[51] Int. Cl.$^5$ ............................................... C08L 7/00
[52] U.S. Cl. ......................................... 524/62; 524/66
[58] Field of Search .................................. 524/66, 62

[56] References Cited

FOREIGN PATENT DOCUMENTS 1-138248  5/1989  Japan ..................................... 524/66

*Primary Examiner*—John C. Bleutge
*Assistant Examiner*—Mark Sweet
*Attorney, Agent, or Firm*—Bucknam and Archer

[57] ABSTRACT

A rubber composition comprising a naturally occurring and/or synthetic rubber and a selected amount of a hydrogen donor material having a hydrogen transfer (hydrogen atom/mol anthracene) of at least 0.1. The composition is highly stable during molding and in use under severe temperature and shearing conditions and substantially immune to deterioration by heat or radiation and ultraviolet rays.

4 Claims, 2 Drawing Sheets

RUBBER COMPOSITIONS

BACKGROUND OF THE INVENTION

1. Field of the Invention

This invention relates to rubber compositions, more particularly to such a rubber composition which is highly stable in its application under elevated temperature conditions.

2. Prior Art

In order to prevent thermal deterioration of rubber, it has been proposed to use various aging inhibitors such as for example hindered phenol and amines which are effective in capturing free radicals emanating from broken or dissociated molecules at an initial stage of deterioration. More specifically, such radicals are captured by H in the phenolic OH or in amino NH of the respective inhibitor. However, such conventional aging inhibitors are susceptible to volatilization at high temperature and hence their ability would decline during ordinary molding and under severe temperature or shearing conditions. Speedier production of molded articles from rubber materials by extrusion, rolling and profiling is nowadays essential to cope with ever increasing demand in many industrial sectors. This may be achieved literally by increasing the molding temperature and at the same time the shearing speed, but this would give rise to thermal deterioration of the material.

At nuclear power plants, it is mandatory to provide proper measures for holding the various rubber component parts harmless against the influence of irradiation with for example X-rays or ultraviolet rays.

SUMMARY OF THE INVENTION

With the foregoing problems of the prior art in view, the present invention seeks to provide rubber compositions which are free from deterioration by heat during molding and under severely high shearing speed and/or high temperature conditions as well as from deterioration by light upon irradiation with X-rays and ultraviolet rays.

According to the invention, there is provided a rubber composition which comprises 100 parts by weight of Component (A) consisting of a naturally occurring and/or synthetic rubber and more than 0.01 part by weight of a hydrogen donor material selected from at least one of Components (B) of the group consisting of a hydrogenated oil [I] resulting from hydrogenation of coal tar or fractionates thereof, a petroleum oil fraction [II] boiling at above 200° C. produced by thermal cracking, catalytic cracking or catalylic reforming, a hydrogenated pitch [III] boiling at 160°-550° C. resulting from hydrogenation of petroleum heavy oil and/or petroleum heavy oil having undergone a primary heat treatment, and a fraction [IV] boiling at 160°-550° C. of the hydrogenated pitch [III] having undergone a secondary heat treatment.

It has now been found that addition of certain selected hydrogenated oils to rubber will eliminate or alleviate its aging or deterioration when exposed to elevated temperature environment as in the molding operation.

DETAILED DESCRIPTION OF THE INVENTION

Figure 1:
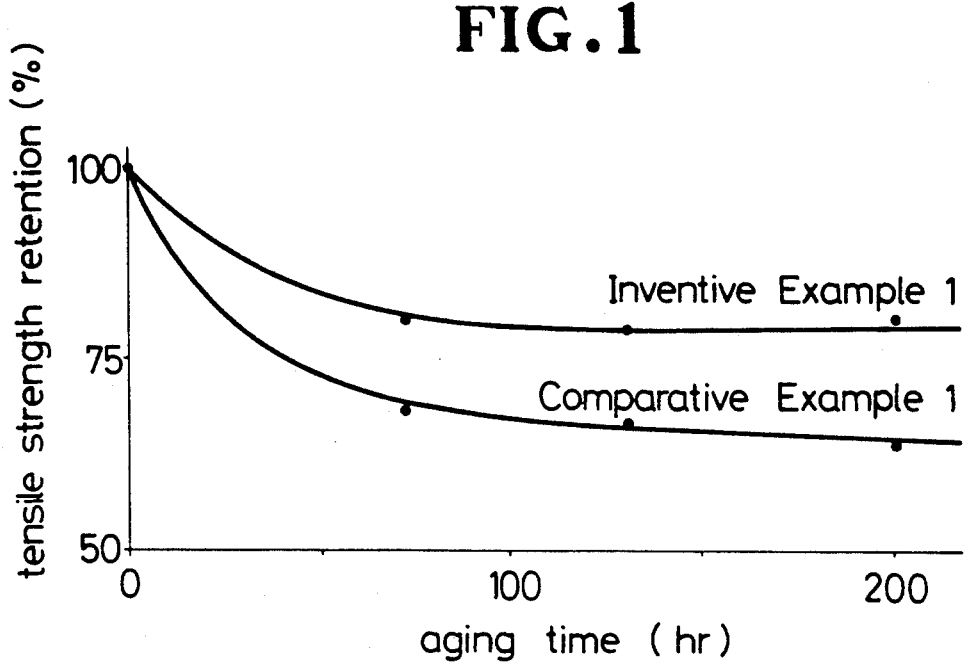
FIG. 1 is a graph showing tensile strength retention of the inventive and comparative test samples as plotted against aging.

The term Component (A) as used herein designates a naturally occurring and/or synthetic rubber including naturally occurring latexes, crude rubber, purified rubber, SP rubber, polyisoprene rubber, polybutadiene rubber, butadiene/styrene rubber, butyl rubber, halogenated butyl rubber, chloroprene rubber, polyisobutylene rubber, ethylene/propylene termpolymer, butadiene/acronitrile rubber, chlorosulfonated polyethylene, polysulfide rubber, silicone rubber, polyacryl rubber, fluorine rubber and polyurethane rubber. These rubbers may be used singly or in combination.

The term hydrogen donor material or hydrogen donor; namely, Component (B) as used herein designates a hydrogenated oil resulting from hydrogenation of at least one of the starting oils including coal tar or fractionates thereof [I], and petroleum oil fractions [II] boiling at above 200° C. produced by thermal cracking, catalylic cracking or catalytic reforming.

Specific examples of oil [I] include treated oil, anthracene oil, phenanthrene oil, tar oil, tar gas oil, carvol oil, naphthalene oil, pitch oil, creosote oil and liquified coal oil either alone or in combination.

Examples of oil [II] include thermally cracked naphtha residue, cycle oil generating from catalytic cracking apparatus (FCC apparatus), slurry oil, decanted oil (DCO), catalytically reformed naphtha residue, thermally cracked crude oil tar and their combinations.

The procedure of hydrogenating the above oils [I] and [II] is optional, but may be usually performed with use of hydrogen gas in the presence of a catalyst having a hydrogenating function. This catalyst may be any known catalyst widely used for hydrogenating petroleum fractions, and specific examples of such catalyst include a catalyst obtained by depositing a sulfide or oxide of at least one metal selected from Groups V--VIII metals, preferably from nickel, cobalt, molybdenum, vanadium and tungsten, on an inorganic carrier such as of alumina, cation-exchanged zeolite or the like, or a catalyst of a type having an aromatic ring nucleushydride and resulting from supporting a metal such as nickel, nickel oxide, nickel-copper, platinum, platinum oxide, platinum-rhodium, platinum-lithium, rhodium, palladium, cobalt, Raney cobalt, ruthenium or the like on an inorganic carrier such as for example of active carbon, alumina, silica-alumina, diatomaceous earth or zeolite.

Petroleum fractions as the starting oil are hydrogenated in the presence of any of the above catalysts having a hydrogenating function preferably at a temperature of 300°-400° C. at an atmospheric pressure of 30-150 or in the presence of an aromatic nucleus hydrogenation catalyst preferably at 150°-300° C. and at 30-150 atmospheric.

The reactor for hydrogenation may be of an ordinary fixed bed type.

The hydrogen donor contemplated under the invention is a material having a hydrogen transfer of at least 0.1 at 350° C. (hydrogen/mol anthracene) as determined by the amount of hydrogen captured by a hydrogen acceptor. A sample of hydrogen donor is reacted with a hydrogen acceptor such as anthracene under a set of conditions, the amount of the acceptor thereby hydrogenated being determined by for example a gas chromatography. More specifically, the donor and the acceptor in a ratio by weight of ½ may be reacted in an autoclave equipped with stirrer under a set of conditions tabulated below.

TABLE 1

| Reaction temperature | 350° C. |
|---|---|
| Reaction pressure | 50 kg/cm² ($N_2$ pressure) |
| Reaction time | 30 minutes |
| Catalyst | none |
| Reactor | 1 liter autoclave with electromagnetic stirrer |
| Donor/Accepter | ½ (by weight ratio) |

After the reaction, the amounts of 9,10-dihydroanthracene, 1,4,5,8-tetrahydroanthracene, 1,4,5,8,9,10-hexahydroanthracene, 1,2,3,4,5,6,7,8-octahydroanthracene and residual anthracenes were determined by gas chromatography. This procedure was based on the teachings by Yokono T., Marsh H. and Yokono M., Fuel, 60, 607 (1981).

Component (B) of the inventive composition further includes hydrogenated pitch fractions boiling in the range of 160°-550° C. resulting from hydrogenation of pitches derived from a primary heat treatment of petroleum heavy oils and/or coal-based heavy oils and such hydrogenated pitches boiling in the range of 160°-550° C. which have been further subjected to a secondary heat treatment. The petroleum heavy oils represent heavy oil fractions boiling at above 200° C. derived by steam cracking or fluid catalytic cracking of petroleum oils, decanted oil (DCO) and heavy cycle oil (HCO). Such heavy oil boiling at above 200° C. are available from fractionates boiling substantially at 200°-450° C. byproduced in the manufacture of ethylene, propylene and other olefinic hydrocarbons resulting from steam cracking of naphtha, kerosene or light oil. Another heavy oil boiling at above 200° C. finds its source from fractionates boiling at 200°-450° C. produced as a byproduct in the manufacture of gasoline and other light oil products resulting from catalytic cracking of kerosene, light oil or topped crude in the presence of naturally occurring or synthetic silica alumina or zeolite catalysts at 450°-550° C. and under atmospheric $-20$ kg/cm².G.

The term coal-based heavy oil used according to the invention includes coal tar or distillates thereof (such as creosote) boiling at above 200° C.

According to the invention, the above heavy oils are subjected to a primary heat treatment at a temperature of 350°-480° C., preferably 380°-450° C., and at a pressure of 2-50 kg/cm², preferably 5-40 kg/cm², for a time length of 15 minutes to 20 hours, the resulting pitch normally softening at 40°-150° C. In this instance, if necessary, light oil fractions may be removed for example by distillation. The pitch is then hydrogenated in the presence of suitable hydrogenation catalysts such as a catalyst composed of a catalyst component chosen from a Group IB metal such as copper, a Group VIB metal such as chromium or molybdenum or a Group VIII metal such as cobalt, nickel, palladium or platinum in the form of a sulfide or oxide and an inorganic carrier such as bauxite, active carbon, diatomaceous earth, zeolite, slica, titania, zirconia, alumina or silca gel.

The hydrogenation reaction though dependent upon the type of catalyst used is effected usually at a temperature of 120°-450° C., preferably 200°-380° C., at a pressure of 20-180 kg/cm².G, preferably 40-150 kg/cm².G, and for a time length of 0.5-3 hours by batch operation, or at LHSV of 0.1-3.0, preferably 0.2-1.5, by continuous operation.

The aromatic nuclei of the aromatic hydrocarbons in the heavy oil fraction are partially hydrogenated during the above reaction at a rate of 10-85%, preferably 20-70%. This hydrogenation rate is defined by the formula $$\text{Hydrogenation Rate} = \frac{\text{Aromatic Ring Carbon Number Prior to Hydrogenation} - \text{Aromatic Ring Carbon Number After Hydrogenation}}{\text{Aromatic Ring Carbon Number Prior to Hydrogenation}}$$

wherein the aromatic ring carbon number is indicated in ASTM D-2140-66.

The resulting hydrogenated pitch can be used per se as Component (B) of the invention, or may be preferably further distilled to yield fractions boiling at 160°-550° C., preferably 200°-550° C. for use as Component (B).

According to the invention, the above hydrogenated pitch may be further subjected to a secondary heat treatment to give fractions boiling at 160°-550° C., preferably 200°-550° C., for use as Component (B). The secondary heat treatment is carried out by passing the hydrogenated pitch through $N_2$, Ar, He, Xe and other gas or vapor inert to the pitch in vacuum of about 0.1-500 mmHg at 340°-450° C., preferably 370°-420° C. Treatment time length is dependent upon temperature, rate of the pitch passing through the inert gas or vapor and other parameters, but ranges usually from 30 minutes to 50 hours, preferably 1-40 hours.

The fractions to be used as Component (B) boiling at 160°-550° C. are obtained from top distillates of the reactor during the secondary heat treatment or by further distillation of the heat-treated fractions. The pitch made available from the secondary heat treatment can be readily used as a starting material for carbon fibers and the like.

It is necessary to retain the deterioration inhibiting components in the rubber to effectively prevent its deterioration during processing and to provide sufficient hydrogen to capture radicals (such as polymer radicals) emanating from the rubber during kneading or use.

The above oils all contain large proportions of such compounds which have dicyclic or greater aromatic rings, or which have a monocyclic aromatic ring and an unsaturated 5-member ring, or mixtures thereof. Therefore, hydrogenation of such oils provides a hydrogen donor material which can readily discharge hydrogen during high shearing, high temperature molding of the rubber material.

It has been found further advantageous according to the invention to use an aging inhibitor or Component (C) which contributes to prevention of deterioration of the rubber material by the effects of heat, radiation or ultraviolet rays.

Such Component (C) includes phenol-based aging inhibitors ($C_1$) such as for example triethyleneglycol-bis[3-(3-t-butyl-5-methyl-4-hydroxyphenyl)propionate], n-octadecyl-3-(3′,5′-di-t-butyl-4′-hydroxyphenyl)propionate, tetrakis-[methylene-3-(3',5'-di-t-butyl-4-hydroxyphenyl)propionate]methane, 1,3,5-trimethyl-2,4,6-tris(3,5-di-t-butyl-4hydroxybenzyl)benzene, tris(3,5-di-t-butyl-4-hydroxybenzyl)isocyanurate, N,N'-hexamethylene-bis(3,5-di-t-butyl-4-hydroxy-hydrocyanamide and the like.

Amine-based aging inhibitors ($C_2$) include for example octyldiphenylamine, 2,4-bis(n-octylthio)-6-(4-hydroxy-3,5-di-t-butylalinino)-1,3,5-triazine, phenyl-1-naphthylamine, N,N'-diphenyl-p-phenylenediamine and the like.

Sulfur-based aging inhibitors ($C_3$) include for example dilaurylthiodipropionate, distearylthiopropionate, pentaerythritol-tetrakis-($\beta$-lauryl-thipropionate) and the like.

Phosphorus-based aging inhibitors ($C_4$) include for example tris(2,4-di-t-butylphenyl)-phosphite, tetrakis(2,4-di-t-butylphenyl)-4,4'-biphenylenephosphonite, di(2,4-di-t-butylphenyl)-pentaerythritoldiphosphite, trisnonylphenylphosphite, diphenylisooctylphosphite, tetratridecyl-4,4'-butylidene-bis(3-methyl-6-t-butyl-phenyl)diphosphite and the like.

Quinoline-based aging inhibitors ($C_5$) includes poly(2,2,4-trimethyl-1,2-dihydroquinoline), and 6-ethoxy-1,2-dihydro-2,2,4-trimethylquinoline.

The above aging inhibitors ($C_1$)–($C_5$) are added in an amount of 0.01–20, preferably 0.05–10, weight parts per 100 weight parts of Component (A) rubber. Departure from this range of addition would serve no useful purposes. Less than 0.01 weight part would not be sufficient to provide a synergistic effect with Component (B), and more than 20 weight parts would only be economically infeasible. Two or more of the above aging inhibitors (C) may be used simultaneously and any of them may be also combined if necessary with light stabilizers such as benzotriazoles, benzophenones, salicylates, nickel complex salts and hindered amines, metallic soaps, nucleating agents, dispersants, plasticizers, organic tin compounds, flame retardants, antistatic agents, lubricants, antiblocking agents, fillers, foaming agents, crosslinking agents, vulcanization promotors, scorch inhibitors, mastication promotors, adhesion impartor, softening agents, reinforcing agents for carbon black, process oil, coloring agents, resins and the like.

The invention will be further described by way of the following examples.

INVENTIVE EXAMPLE 1 AND COMPARATIVE EXAMPLE 1

Figure 2:
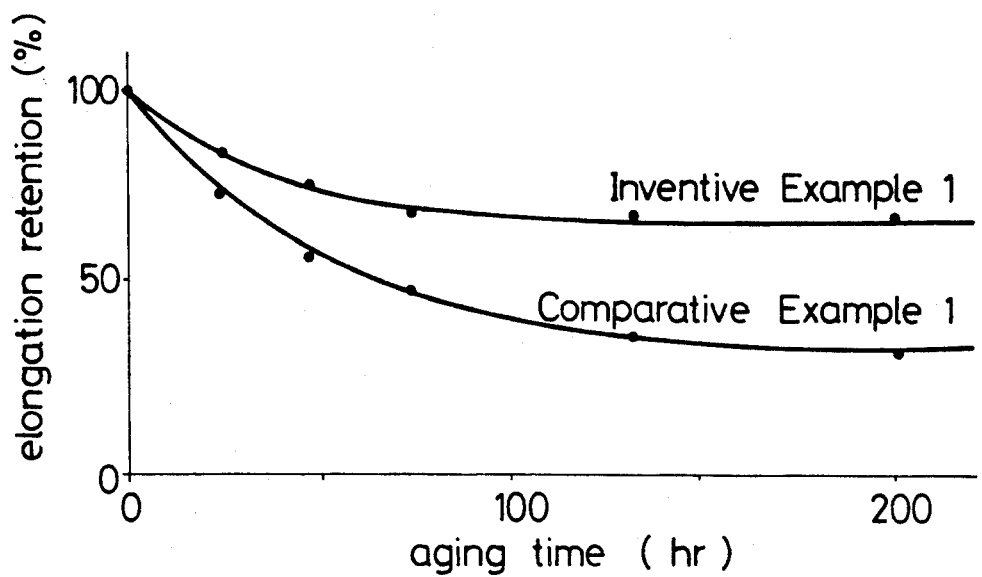
FIG. 2 is a graph showing elongation retention of the inventive and comparative test samples as plotted against aging.

Styrene/butadiene rubber (SBR) after vulcanization was subjected to aging test (JIS K6301) using Geer oven at 110° C. for 200 hours and thereafter tested for tensile strength and elongation. Test sample in Comparative Example 1 was devoid of Component (B). Test Sample in Inventive Example 1 contained 0.7 weight % of hydrogenated anthracene oil (Component B) boiling in the range of 250°–420° C. Test results were graphically displayed in FIGS. 1 and 2.

INVENTIVE EXAMPLES 2 AND 3 AND COMPARATIVE EXAMPLE 2

Figure 3:
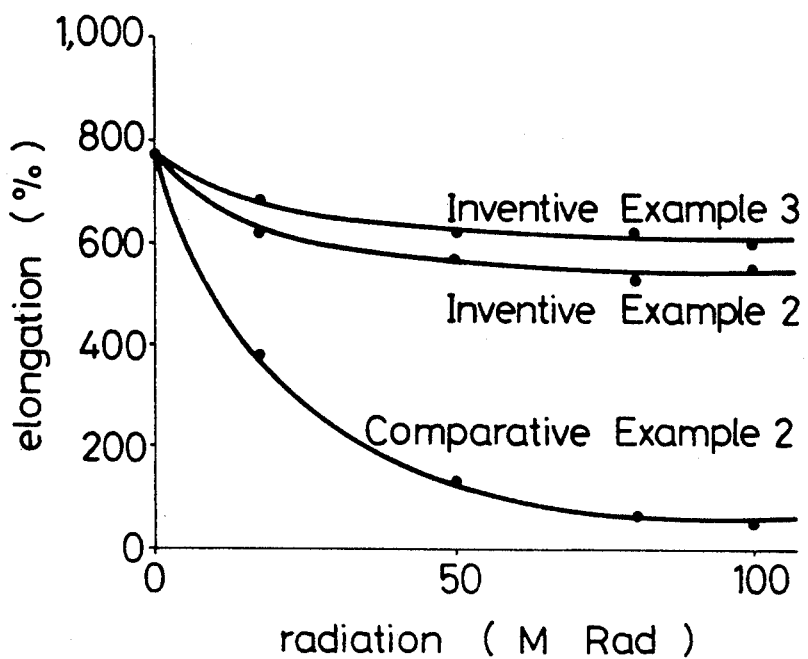
FIGS. 3 and 4 are graphs showing elongation of the inventive and comparative test samples as plotted against irradiation.

Vulcanized SBR was tested for deterioration by radiation. Test pieces used in the respective Examples were irradiated with a fixed amount of 0.8 M Rad/hr. γ-rays in the atmosphere and tested for elongation. Test piece in Comparative Example 2 was free of Component (B). Test piece in Inventive Example 2 contained 1.0 weight % of Component (B) (hydrogenated pitch boiling between 280° and 450° C. resulting from a pitch derived by a primary heat treatment of petroleum heavy oil). Test piece for Inventive Example 3 contained 1.0 weight % of Component (B) (hydrogenated pitch in Inventive Example 2 which is further subjected to a secondary heat treatment). Test results are shown in FIG. 3.

INVENTIVE EXAMPLE 4 AND COMPARATIVE EXAMPLE 3

Figure 4:
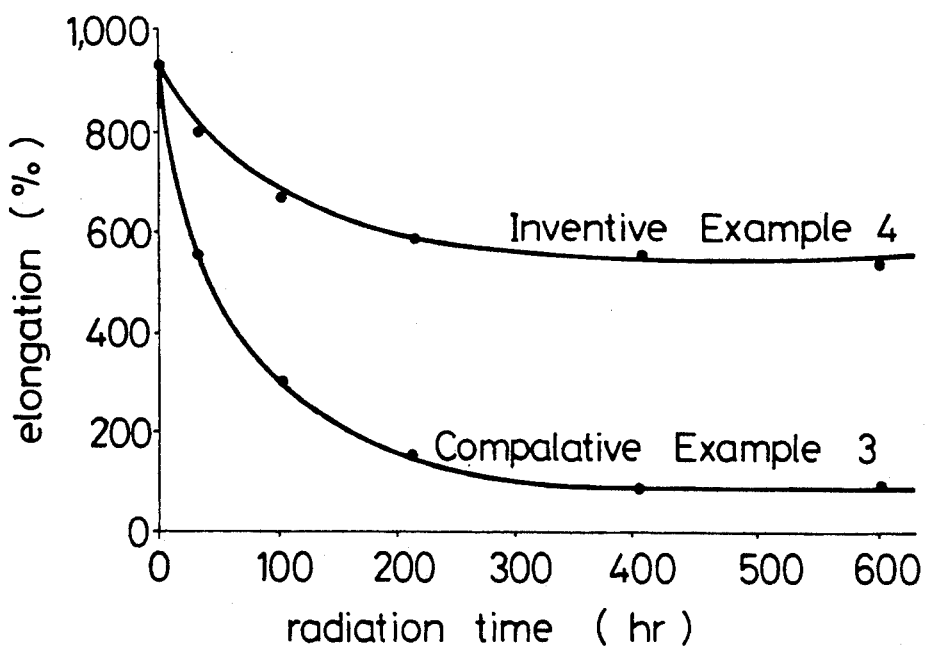

Vulcanized naturally occurring rubber was tested for deterioration by irradiation of a fixed amount of 400 NM ultraviolet rays and thereafter checked for elongation with the test results shown in FIG. 4.

Component (B) was not incorporated in test piece for Comparative Example 3. Test piece for Inventive Example 4 contained 2.0 weight % of Component (B) (fractionates boiling at 230°–380° C. derived from hydrogenating thermally cracked naphtha residues).

What is claimed is:

1. A rubber composition which comprises 100 parts by weight of Component (A) consisting of natural rubber or synthetic rubber or mixtures thereof and more than 0.01 part by weight of a hydrogen donor material selected from at least one Component (B) which is a member selected from the group consisting of a hydrogenated oil [I] resulting from hydrogenation of coal tar or fractionates thereof, a petroleum oil fraction [II] boiling at above 200° C. produced by thermal cracking, catalytic cracking or catalytic reforming, a hydrogenated pitch [III] boiling at 160°–550° C. produced by hydrogenation of petroleum heavy oil or petroleum heavy oil having undergone a primary heat treatment, or mixtures thereof and a fraction [IV] boiling at 160°–550° C. of said hydrogenated pitch [III] having undergone a secondary heat treatment, wherein said hydrogen donor material has a hydrogen transfer to a hydrogen acceptor of at least 0.1 (hydrogen atom/mol anthracene) at 350° C.

2. A rubber composition which comprises 100 parts by weight of Component (A) consisting of a naturally occurring or synethetic rubber or mixtures thereof and more than 0.01 part by weight of a hydrogen donor material selected from at least one Component (B) which is a member selected from the group consisting of a hydrogenated oil [I] resulting from hydrogenation of coal tar or fractionates thereof, a petroleum oil fraction [II] boiling at above 200° C. produced by thermal cracking, catalytic cracking or catalytic reforming, a hydrogenated pitch [III] boiling at 160°–550° C. produced by hydrogenation of petroleum heavy oil or petroleum heavy oil having undergone a primary heat treatment, or mixtures thereof and a fraction [IV] boiling at 160°–550° C. of said hydrogenated pitch [III] having undergone a secondary heat treatment, wherein said hydrogen donor material has a hydrogen transfer to a hydrogen acceptor of at least 0.1 (hydrogen atom/mol anthracene) at 350° C., and 0.01-20 weight parts of at least one Component (C) which is a member selected from the group consisting of hindered phenol-based, phosphor-based, thioether-based, amine-based and quinoline-based aging inhibitors.

3. A rubber composition according to claim 1 wherein said coal tar or fractionates thereof [I] is an oil selected from the group consisting of a treated oil, anthracene oil, tar oil, tar gas oil, carvol oil, naphthalene oil, pitch oil, creosote oil, liquified coal tar oil and mixtures thereof.

4. A rubber composition according to claim 1 wherein said petroleum oil fraction [II] is selected from the group consisting of a thermally cracked naphtha oil, catalytically cracked cycle oil, slurry oil, decanted oil (DCO), catalylically reformed naphtha residual oil, cracked crude oil tar and mixtures thereof.

* * * * *